United States Patent
Takahashi (10) Patent No.: US 6,345,336 B1
(45) Date of Patent: Feb. 5, 2002

(54) INSTRUCTION CACHE MEMORY INCLUDES A CLOCK GATE CIRCUIT FOR SELECTIVELY SUPPLYING A CLOCK SIGNAL TO TAG RAM TO REDUCE POWER CONSUMPTION

(75) Inventor: Masafumi Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/478,827

(22) Filed: Jan. 6, 2000

(30) Foreign Application Priority Data

Jan. 6, 1999 (JP) .......................................... 11-001385

(51) Int. Cl.[7] .............................. G06F 12/00; G06F 1/32
(52) U.S. Cl. .................... 711/125; 711/154; 711/167; 711/128; 711/3; 711/215; 711/213; 713/322
(58) Field of Search ................................. 711/125, 154, 711/167, 128, 215, 123, 3, 118, 204, 213; 713/300–324, 500, 601; 712/208, 233

(56) References Cited

U.S. PATENT DOCUMENTS

| | | | | |
|---|---|---|---|---|
| 5,530,932 A | | 6/1996 | Carmean et al. ............. | 713/324 |
| 5,669,003 A | | 9/1997 | Carmean et al. ............. | 713/322 |
| 5,752,045 A | * | 5/1998 | Chen ........................... | 713/322 |
| 5,761,715 A | | 6/1998 | Takahashi .................... | 711/128 |
| 5,835,934 A | * | 11/1998 | Tran .............................. | 711/3 |
| 5,845,309 A | * | 12/1998 | Shirotori et al. ............... | 711/3 |
| 5,911,058 A | * | 6/1999 | Ogawa ......................... | 712/219 |
| 5,913,223 A | * | 6/1999 | Sheppard et al. ........... | 711/118 |
| 5,920,888 A | | 7/1999 | Shirotori et al. ............. | 711/128 |
| 5,940,857 A | * | 8/1999 | Nakanishi et al. .......... | 711/137 |
| 5,974,505 A | * | 10/1999 | Kuttanna et al. ........... | 711/118 |
| 6,167,506 A | * | 12/2000 | Witt ............................... | 712/213 |
| 6,237,087 B1 | * | 5/2001 | O'Connor .................... | 712/226 |
| 6,256,728 B1 | * | 7/2001 | Witt et al. .................... | 712/236 |

* cited by examiner

Primary Examiner—Hong Kim
(74) Attorney, Agent, or Firm—Hogan & Hartson, L.L.P.

(57) ABSTRACT

An instruction cache memory (12) includes a clock gate circuit (26) for controlling the supply of a clock signal (CLK) to tag RAM (22). The clock gate circuit (22) supplies the clock signal (CLK) to tag RAM 22 only when there is a movement in cache line for storing a word to be read out or a branch instruction is detected in a processor (14). As a result, power consumption of the tag RAM (22) can be reduced.

17 Claims, 6 Drawing Sheets

INSTRUCTION CACHE MEMORY INCLUDES A CLOCK GATE CIRCUIT FOR SELECTIVELY SUPPLYING A CLOCK SIGNAL TO TAG RAM TO REDUCE POWER CONSUMPTION

BACKGROUND OF THE INVENTION

1. Field of the Invention

This invention relates to an instruction cache memory, and in particular, relates to the instruction cache memory designed to reduce the power consumption.

2. Description of the Related Background Art

Figure 7:
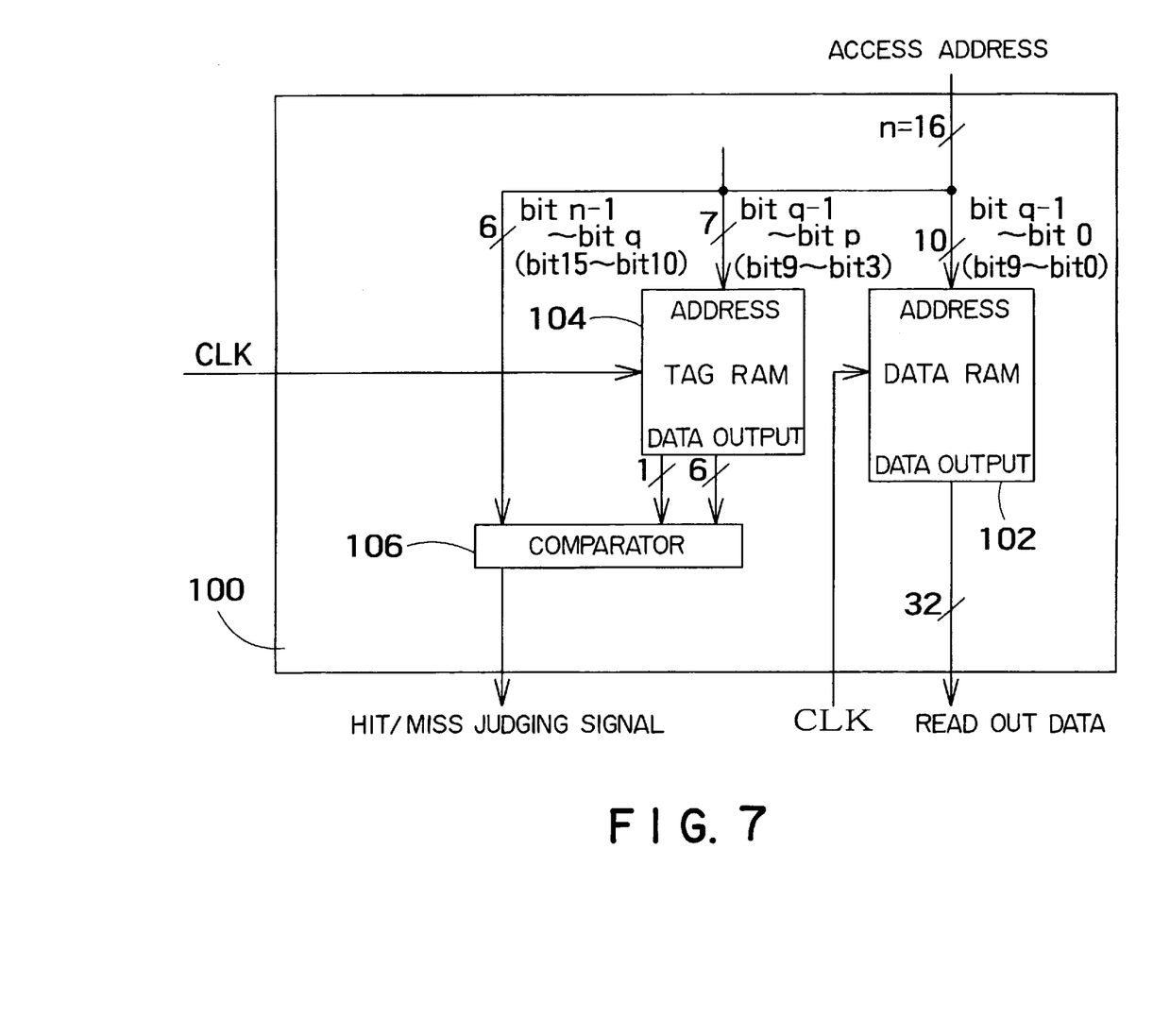
FIG. 7 is a diagram showing a structure of a conventional instruction cache memory.

Recently, computer systems, in general, are equipped with an instruction cache memory for the purpose of decreasing the memory access latency. FIG. 7 is a diagram which shows a structure of an instruction cache memory of a conventional direct mapping type.

It will be apparent from FIG. 7 that the instruction cache memory 100 is made up of data RAM 102, tag RAM 104 and comparator 106. An access address is inputted to the instruction cache memory 100 from a fetch counter provided in a processor. Depending upon the size and structure of the instruction cache memory 100, part of the access address is inputted to the data RAM 102, and part thereof is inputted to the tag RAM 104. This conventional technology assumes the use of an instruction cache memory 100 in which data RAM capacity is 1 K words, one cache line size is 8 words, and total number of cache lines is 128. Here, one word is the unit of a single instruction, and it is assumed to be 32 bits in this conventional technology.

In this case, among the access address of 16 bits from the fetch counter, 10 bits totaling low order bits bit9 through bit0 are inputted to the data RAM, 7 bits totaling bit9 through bit3 are inputted to the tag RAM 104, and 6 bits totaling high order bits bit15 to bit10 are inputted to the comparator 106. If these bits are expressed in general formulas, those inputted to the data RAM 102 are expressed as bit q-1~bit 0, those inputted to the tag RAM 104 are expressed as bit q-1~bit p, and those inputted to the comparator 106 are expressed as bit n-1~bit q. In FIG. 7, n (number of bits of the access address)=16, p (number of bits necessary for specifying an address in a single cache line)=3, and q (number of bits necessary for specifying an address in the data RAM 102)= 10. The data RAM 102 and the tag RAM 104 are also supplied with a clock signal CLK.

The tag RAM 104 output an access address, which a cache line assigned to the address expressed by bit 9~bit 3 holds, as a tag signal of 6 bits in total. Also outputted is a status bit of one bit which indicates whether the corresponding cache line has ever taken data from main memory at least once. These tag signal and status bit are inputted into the comparator 106. The comparator 106 compares the received tag signal of 6 bits with 6 bits totaling bit15~bit10 of the access address. When they coincide, it is a hit. When they do not coincide, it is a miss. Based on the result of the comparison, the comparator 106 outputs a hit/miss judging signal to the processor.

In parallel with the operation of the comparator 106, data is read out from the data RAM 102 and supplied as an instruction to the processor. Whether or not the processor takes this instruction supplied from the data RAM 102 is determined by whether the hit/miss judging signal of the comparator 106 indicates a cache hit or cache miss. That is, in case of a cache hit, the processor takes this data as an instruction, and in case of a cache miss, the processor does not take this data.

In the cache memory 100 shown in FIG. 7, two memories, namely, data RAM 102 and tag RAM 104, operate upon every time when it is accessed. Therefore, the cache memory 100 involved the problem that it occupied a large part of hardware and consumed large power.

SUMMARY OF THE INVENTION

It is therefore an object of the invention to reduce power consumption of an instruction cache memory. More specifically, the object of the invention lies in alleviating operation of tag RAM in the instruction cache memory and thereby reduce power consumption by the tag RAM.

According to an aspect of the invention, there is provided an instruction cache memory comprising:

data RAM including a plurality of cache lines for storing a plurality of words which have consecutive memory addresses to output read-out data in response to an access address inputted from a processor;

tag RAM for storing data necessary for specifying the memory addresses of the words stored in the cache lines as tag addresses for each cache line of the data RAM, and outputting one of the tag addresses of corresponding one of the cache lines as a tag signal in response to the access address inputted from the processor;

a hit/miss judging circuit for comparing the tag signal outputted from the tag RAM with the access address from the processor to judge whether a word having the memory address corresponding to the access address is stored in the data RAM or not and output a result of the judgement as a hit/miss judging signal; and a clock gate circuit for supplying a clock signal to the tag RAM only when the cache line for storing the word to be read out changes from one to another, and/or, a branch instruction is detected in the processor, and otherwise stop the supply of the clock signal to the tag RAM.

According to a further aspect of the invention, there is provided an instruction cache memory which is supplied with an access address of n bits from bit n-1 to bit 0 and a basic clock signal which changes between HIGH and LOW levels in each clock cycle repeatedly in all clock cycles and outputs a hit/miss judging signal of one bit and a read-out data of m bits, comprising:

data RAM including a plurality of cache lines for storing a plurality of words which have a number of consecutive memory addresses which can be expressed by p bits and having a memory size which can be expressed by q bits, the data RAM being supplied with low order bits which are bit q-1 through bit 0 among n bits of the access address, and outputting the read-out data of m bits;

tag RAM for storing high order bits which are bit n-1 through bit q among n bits of the memory address of a plurality of words stored in each cache line as a tag address for each cache line, the tag RAM being supplied with bit q-1 to bit p among n bits of the access address and outputting the tag address stored in association with a cache line specified by bit q-1 through bit p as a tag signal;

a hit/miss judging circuit supplied with the tag signal outputted from the tag RAM and high order bits which are bit n-1 through bit q among n bits of the access address to compare the tag signal with the bit n-1 through bit q and output a hit/miss judging signal of one bit which indicates whether a word having the memory address corresponding to the access address is stored in the data RAM or not; and a clock gate circuit for supplying a clock signal as a supplied clock signal to the tag RAM only when the cache line for storing the word to be read out changes from one to another, and/or, a branch instruction is detected in the processor, and otherwise stopping the supply of the supplied clock signal to the tag RAM.

According to a still further aspect of the invention, there is provided an instruction cache memory of an x-way set associative mapping type which is supplied with an access address of n bits from bit n-1 through bit 0 and a basic clock signal which changes between HIGH and LOW levels in each clock cycle repeatedly in all clock cycles and outputs x hit/miss judging signals of one bit and one read-out data of m bits, the cache memory including x basic units each outputting one of the hit/miss judging signal of one bit and one unit read-out data of m bits, each basic unit comprising:

data RAM including a plurality of cache lines for storing a plurality of words having a number of consecutive memory addresses which can be expressed by p bits and having a memory size which can be expressed by q-x-1 bits, the data RAM being supplied low order bits which are bit q-x through bit 0 among n bits of the access address, and outputting the unit read-out data of m bits;

tag RAM for storing high order bits which are bit n-1 through bit q-x-1 among n bits of the memory address of a plurality of words stored in each cache line as a tag address for each cache line, the tag RAM being supplied with bit q-x through bit p among n bits of the access address and outputting the tag address stored in association with a cache line specified by bit q-x through bit p as a tag signal;

a hit/miss judging circuit supplied with the tag signal outputted from the tag RAM and high order bits which are bit n-1 through bit q-x-1 among n bits of the access address to compare the tag signal with bit n-1 through bit q-x-1 and output a hit/miss judging signal of one bit which indicates whether a word having the memory address corresponding to the access address is stored in the data RAM or not; and a clock gate circuit for supplying a clock signal as a supplied clock signal to the tag RAM only when the cache line for storing the word to be read out changes from one to another, and/or, a branch instruction is detected in the processor, and otherwise stopping the supply of the supplied clock signal to the tag RAM, wherein the instruction cache memory further comprises:

a multiplexer supplied with each unit read-out data outputted from each basic unit and each hit/miss judging signal, the multiplexer outputting the unit read-out data outputted from one of the basic units which outputs the hit/miss judging signal indicating that the word having the memory address corresponding to the access address is store in the data RAM thereof as the read-out data to the processor.

DETAILED DESCRIPTION OF THE PREFERRED EMBODIMENTS

In the instruction cache memory according to the embodiment shown here, a signal of two bits in total, including one bit indicating whether any branch instruction has been generated or not and one bit indicating whether any cache line is changed or not, are used, and by recognizing that the cache line is not changed, a cache hit is confirmed. When a cache hit is confirmed, access to the tag RAM and operation of the comparator are interrupted for the purpose of reducing power consumption of the instruction cache memory. Explanation is made below in greater detail.

Figure 1:
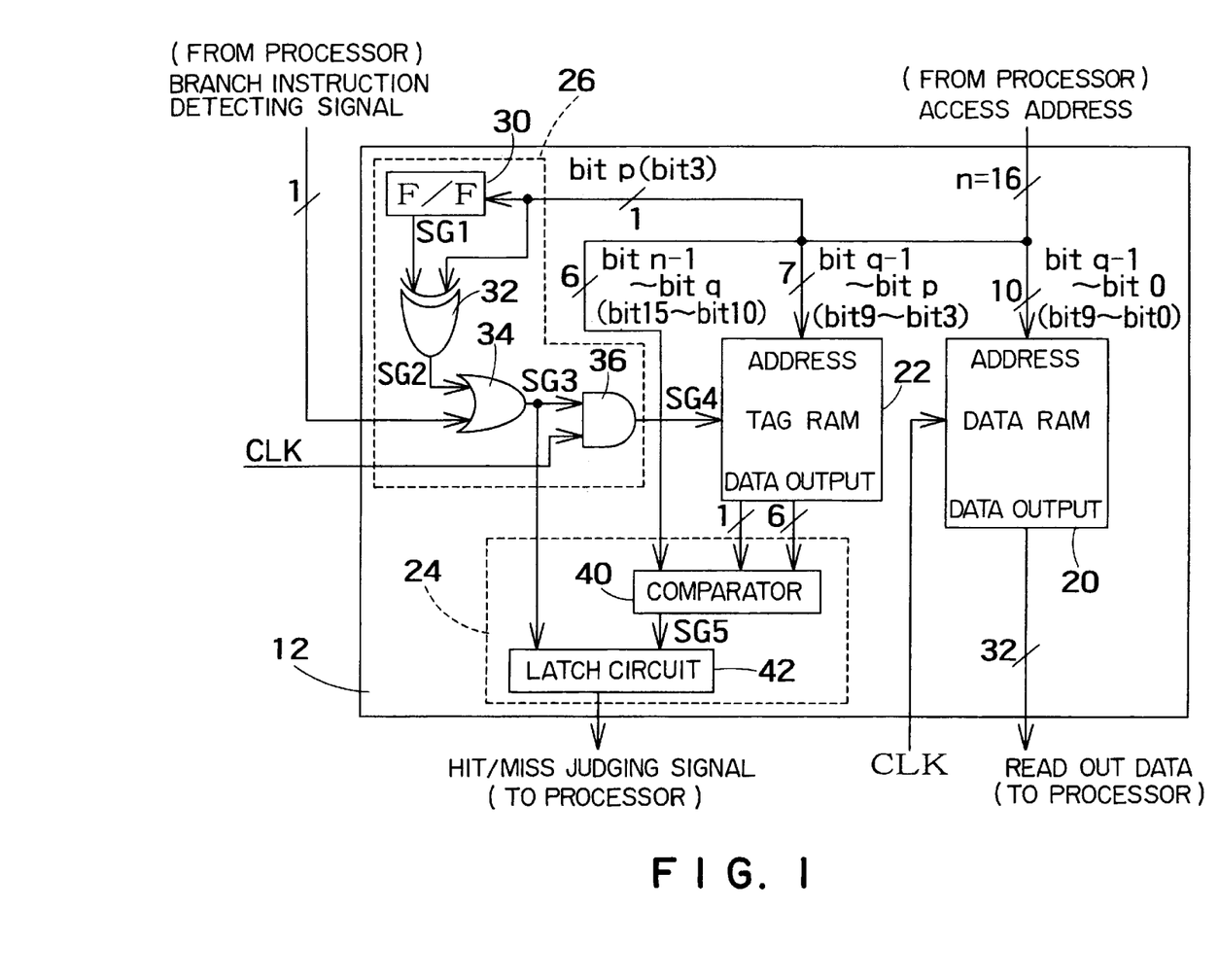
FIG. 1 is a diagram showing a structure of an instruction cache memory of a direct mapping type according to an embodiment of the invention.
Figure 2:
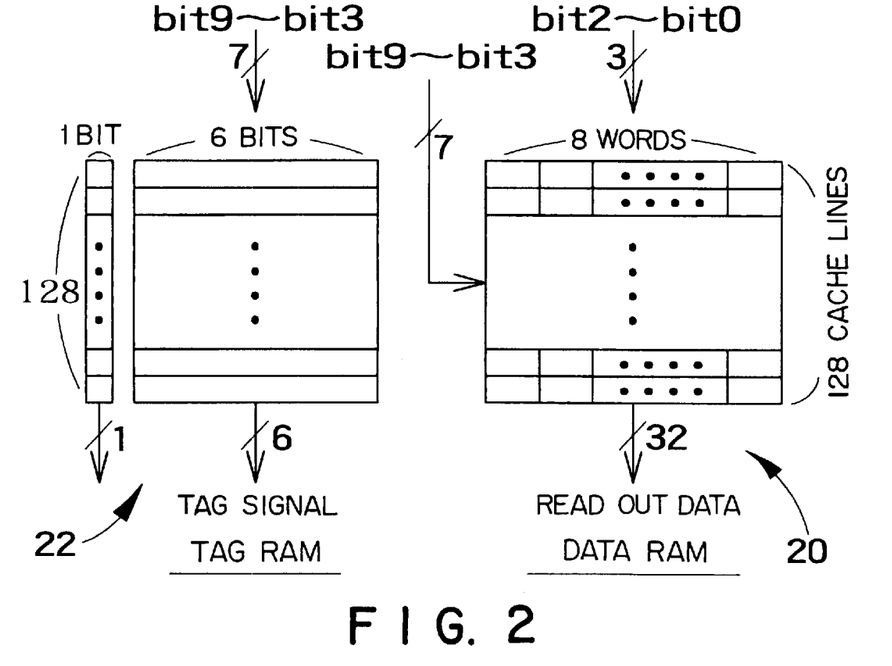
FIG. 2 is a diagram showing a logic structure of tag RAM and data RAM of a direct mapping type.
Figure 3:
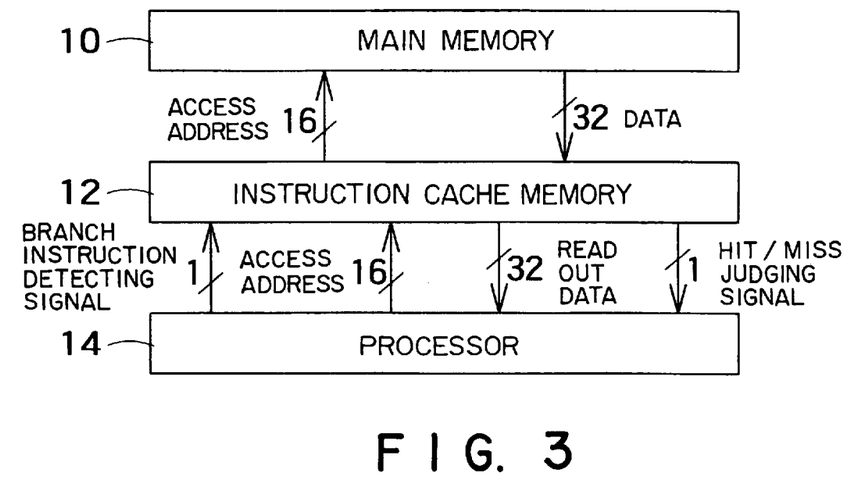
FIG. 3 is a diagram showing a structure of a computer system having the instruction cache memory according to the invention.

FIG. 1 is a diagram showing a construction of the instruction cache memory according to the embodiment. FIG. 2 is a diagram showing a logic structure of tag RAM and data RAM of a direct mapping type. FIG. 3 is a structure of a computer system using the instruction cache memory according to this embodiment.

Referring to FIG. 3, the computer system according to the embodiment includes a main memory 10, instruction cache memory 12 and processor 14.

The processor 14 outputs to the instruction cache memory 12 an access address of 16 bits and a branch instruction detecting signal of one bit which indicates whether a branch instruction has been processed or not. The "branch instruction" is a generic name of a jump instruction, instruction for calling out a sub routine and interrupt instruction or other instruction which causes the fetch counter in the processor 14 to jump from one to another. The instruction cache memory 12 outputs to the processor 14 a read-out data of 32 bits as an instruction and a hit/miss judging signal of one bit which indicates whether a cache hit is occurred in the instruction cache memory 12 or not.

The instruction cache memory 12 outputs to the main memory 10 an access address of 16 bits. The main memory 10 outputs a data of 32 bits as an instruction to the instruction cache memory 12. Thus, when a cache miss is occurred in the instruction cache memory 12, necessary data can be taken from the external main memory 10. The instruction cache memory 12 also includes a controller necessary for this take-in operation.

FIG. 1 is a diagram which shows an interior structure of the instruction cache memory 12 when employing a direct mapping system.

Referring to FIG. 1, the instruction cache memory 12 includes a data RAM 20, tag RAM 22, hit/miss judging circuit 24 and clock gate circuit 26. An access address is inputted to the instruction cache memory 12 from a fetch counter provided in the processor 14. In the instruction cache memory 12 shown here, the data RAM capacity is 1 K words, one cash line size is 8 words, and the total number of cache lines is 128. Here, one word is the unit of a single instruction, and it is assumed to be 32 bits in this embodiment.

In this case, among the access address of 16 bits from the fetch counter, 10 bits totaling low order bits bit9 through bit10 are inputted to the data RAM 20, 7 bits totaling bit9 through bit3 are inputted to the tag RAM 22, 6 bits totaling high order bits bit15 to bit10 are inputted to the hit/miss judging circuit 24, and 1 bit of bit3 is inputted to clock gate circuit 26. If these bits are expressed in general formulas, those inputted to the data RAM 20 are expressed as bit q-1~bit 0, those inputted to the tag RAM 22 are expressed as bit q-1~bit p, those inputted to the hit/miss judging circuit 24 are expressed as bit n-1~bit q, and it inputted to clock gate circuit 26 is expressed as bit p. In this embodiment, n (number of bits of the access address)=16, p (number of bits necessary for specifying an address in a single cache line)=3, and q (number of bits necessary for specifying an address in the data RAM 102)=10.

As shown in FIG. 2, in the data RAM 20, 7 bits in total of bit9 through bit3 definitely determine in which cache line the word designated by the access address should be stored. Further, 3 bits totaling bit2~bit10 determine an address in the cache line, and specify the position for storing the word designated by the access address. Data of one word at the position specified in this manner are outputted as read-out data of 32 bits from the data RAM 20.

The tag RAM 22 holds, for each cache line, data of 6 bits necessary for specifying the address of a word stored in the cache line. The data of 6 bits correspond to high order bits, bit15~bit10, of the access address. Inputted to the tag RAM 22 are 7 bits ($2^7$=128) totaling bit9~bit3 in the access address, and a cache line which should store the word designated by the access address is determined definitely. Then, the tag RAM 22 outputs the data of 6 bits stored in the definitely determined cache line as a tag signal. The tag signal corresponds to high order bits, bit15~bit10, of the access address as explained above.

In the tag RAM 22, one bit is assigned to each cache line as a status bit which indicates whether the cache line has ever taken data from the main memory 10 at least once. In this embodiment, when data has never been taken into the cache line from the main memory 10, such as immediately after turning on the power source, all status bits are 0. And, when the cache line is specified by the processor 14 and data is taken from the main memory 10, the status bit corresponding to the cache line is set in 1. When the tag RAM 22 outputs the tag signal, one of the status bits corresponding to the very cache line is also outputted to the hit/miss judging circuit 24.

As shown in FIG. 1, the data RAM 20 is directly supplied with a clock signal CLK. The tag RAM is supplied with the clock signal CLK through a clock gate circuit 26. The clock gate circuit 26 supplies the tag RAM 22 with the clock signal CLK only at a specific timing explained later.

A bit, bit3, inputted to the clock gate circuit 26 is inputted to both a flip-flop circuit 30 and an EXOR circuit 32. The EXOR circuit 32 is also supplied with a signal SG1 outputted from the flip-flop circuit 30. The flip-flop circuit 30 is used to hold the last value of bit3. A signal SG2 outputted from the EXOR circuit 32 is inputted to an OR circuit 34. The OR circuit 34 also receives a branch instruction detecting signal as another input thereof. A signal SG3 outputted from the OR circuit 34 is inputted to an AND circuit 36 and a hit/miss judging circuit 24. Also inputted to the AND circuit 36 is the clock signal CLK. An output signal SG4 of the AND circuit 36 is inputted to the tag RAM 22. Thus the clock gate circuit 26 is made up of the flip-flop circuit 30, EXOR circuit 32, OR circuit 34 and AND circuit 36. That is, the clock gate circuit 26 is configured to supply the clock signal CLK to the tag RAM 22 only when a branch instruction is detected in the processor 14 and the branch instruction detecting signal becomes HIGH, or when bit3 in the access address changes and the cache line in the data RAM 20 changes.

As explained above, outputted from the tag RAM 22 is a tag signal of 6 bits in total for the address held in a corresponding cache line in direct mapping. Also outputted is the status bit indicating whether the corresponding cache line has ever taken data from the main memory 10 at least once. These tag signal and status bit are inputted to the hit/miss judging circuit 24.

The hit/miss judging circuit 24 includes a comparator 40 and a latch circuit 42. The comparator 40 is supplied with the tag signal of 6 bits, status bit of one bit, and 6 bits of bit15~bit10 as a part of the access address. The comparator 40 compares the inputted tag signal of 6 bits with 6 bits, bit15~bit10, of the access address. If the comparison results in confirming coincidence between them, it is a cache hit. If they do not coincide, it is a cache miss. The comparator 40 used in this embodiment outputs an output signal SG5 which is LOW upon a cache hit and HIGH upon a cache miss. Consequently, in the embodiment shown here, when the status bit is 0, namely, if data has never been taken in the corresponding cache line, the comparator 40 outputs a HIGH output signal SG5 indicating the cache miss without the above-mentioned comparison of 6 bits.

The output signal SG5 from the comparator 40 and the output signal SG3 from the OR circuit 24 are inputted to the latch circuit 42. The latch circuit 42 holds the status of the output signal SG5 appearing upon the output signal SG3 becoming HIGH until the output signal SG3 becomes HIGH again, and outputs it as the hit/miss judging signal. And the latch circuit 42 outputs literally the value of the output signal SG5 inputted then as the hit/miss judging signal, while the output signal SG3 is high. This hit/miss judging signal is inputted to the processor 14. In this embodiment, the hit/miss judging signal becomes LOW upon a cache hit and HIGH upon a cache miss.

In parallel with these operations, data is read out from the data RAM 20 and supplied as an instruction to the processor 14. Whether the instruction supplied from the data RAM 20 is taken or not is determined depending upon the hit/miss judging signal. That is, when the hit/miss judging signal indicates a cache hit, the processor 14 takes the data in as an instruction. When the hit/miss judging signal indicates a cache miss, the processor 14 does not take this data in.

Figure 4:
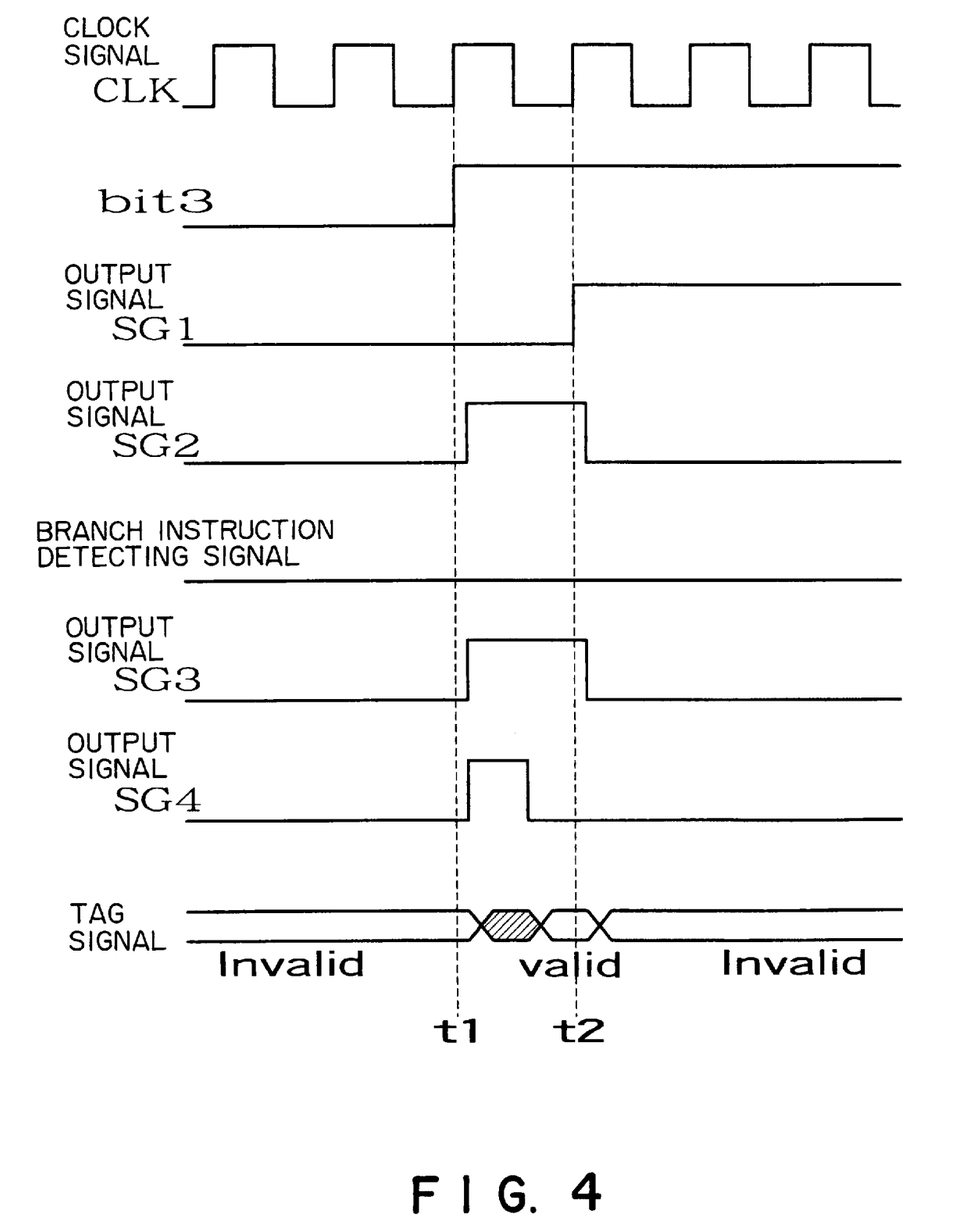
FIG. 4 is a timing chart for explaining operations of the instruction cache memory according to the embodiment of the invention (in case that the cache line changes upon a change of bit 3 in an access address)
Figure 5:
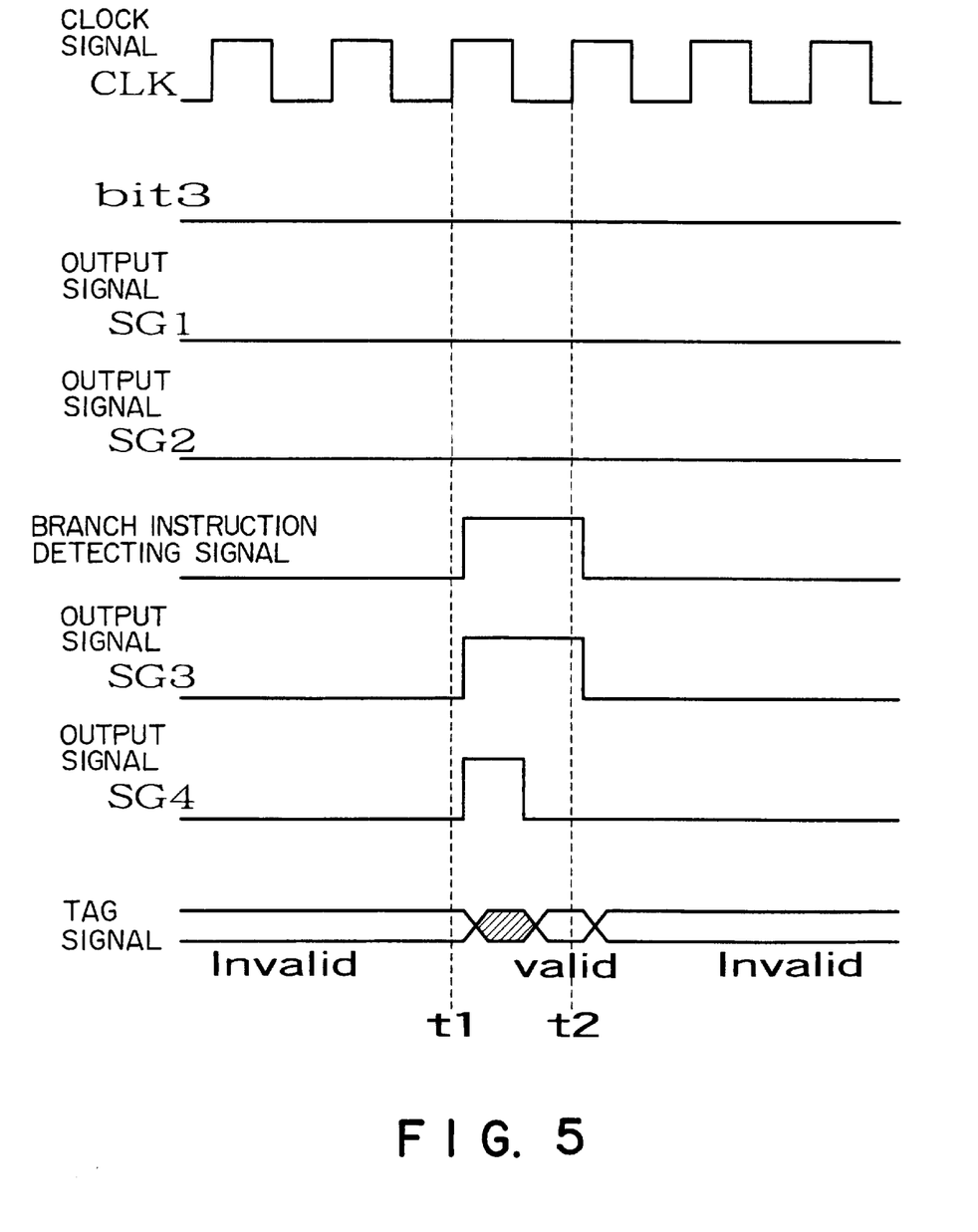
FIG. 5 is a timing chart for explaining operations of the instruction cache memory according to the embodiment of the invention (in case that the cache line changes upon detection of a branch instruction in the processor)

Next explained are operations of the cache memory with reference to the timing charts shown in FIGS. 4 and 5. FIG. 4 is the timing chart which shows the timing of a change in cache line and bit3 in the access address changes. FIG. 5 is the timing chart which shows the timing of a change in cache line because of a branch instruction detected.

First referring to FIG. 4, the timing of a change in cache line and a change of bit3 in the access address. As shown in FIG. 4, assume that bit3 changes from LOW to HIGH at time t1. That is, assume that bit3 in the access address changes from 0 to 1. This means that the cache line in the data RAM 20 storing a word to be read out moves from a certain one to the next one as shown in FIG. 2. This is because one cache line is made up of 8 words in this embodiment, and it can be considered that, in a range where bit2~bit0 change while an instruction is read sequentially, the word to be read out is stored in the same cache line. Such a change of bit3 while an instruction is read sequentially means that reading of words stored in one cache line has been finished and reading of words to be stored in the next cache line has been started. Therefore, whether the cache line to store a word to be read out has moved to the next cache line or not can be known by monitoring bit3 alone.

As shown in FIG. 4, the output signal SG1 from the flip-flop circuit 30 changes to HIGH at time t2 later by one clock cycle than time t1 where bit3 changes to HIGH. Therefore, the output signal SG2 from the EXOR circuit 32 becomes HIGH in the period between time t1 and time t2. In FIG. 4 assuming that no branch instruction is detected, the branch instruction detecting signal remains LOW.

In the period from time t1 to time t2, the OR circuit 34 supplied with the HIGH output signal SG2 outputs a HIGH output signal SG3. Therefore, the output signal SG4 is output from the AND circuit 36 for only one clock cycle. Based on the output signal SG4 of one clock cycle, the tag RAM 22 is activated to output a tag signal of 6 bits to the hit/miss detecting circuit 24. That is, in any period other than the period from time t1 to time t2, the supply of the clock to the tag RAM 22 interrupts. Therefore, the tag signal is valid only for the period of the latter half clock cycle in between time t1 and time t2, and invalid in the other periods. Output signals SG2, SG3 and SG4 are slightly behind the clock signal CLK due to a delay in operation of the logic circuit.

Next referring to FIG. 5, explanation is made about the timing of a change in cache line upon detection of a branch instruction in the processor 14.

As shown in FIG. 5 assuming that bit3 does not change, output signal SG1 and SG2 remain LOW. And at time t1, a branch instruction is detected in the processor 14, and the branch instruction detecting signal changes from LOW to HIGH. This branch instruction detecting signal maintains the HIGH level only for one clock cycle. Therefore, at time t2, the branch instruction detecting signal changes from HIGH to LOW.

The branch instruction detecting signal changed to HIGH at time t1 is inputted to the OR circuit 34. Therefore, the OR circuit 34 outputs a HIGH output signal SG3 in the period between time t1 to time t2. The AND circuit 36 supplied with this output signal SG3 supplies the output signal SG4 for only one clock cycle between time t1 and time t2. Based on the output signal SG4 of one clock cycle, the tag RAM 22 is activated to output the tag signal of 6 bits to the hit/miss judging circuit 24. That is, in the periods other than the period from time t1 to time t2, supply of the clock to the tag RAM 22 interrupts. Therefore, the tag signal is valid only for the latter half clock cycle in between time t1 and time t2, and invalid in the other periods. Output signals SG3 and SG4 are slightly behind the clock signal CLK due a delay in operation of the logic circuit.

As explained above, since the instruction cache memory 12 according to the embodiment is configured that the clock signal CLK is supplied to the tag RAM 22 only when the cache line in the data RAM 20 for storing a word to be read out changes from one to another, power consumption in the instruction cache memory 12 can be reduced. In greater detail, since the clock signal CLK is supplied to the tag RAN 22 only when bit3 in the access address from the processor 14 changes or the branch instruction detecting signal from the processor becomes HIGH, power consumption can be reduced so much as the supply of the clock signal CLK is stopped in the other cases.

This is based on the nature of instructions of computers, namely, that fetch counters are counted up one by one when an instruction is not a branch instruction. Therefore, if it is in a cache line of 8 words, it can be considered that the word of the next access address is also stored in the data RAN 20. Therefore, as long as the word stored in one cache line is read out, a cache hit can be recognized without activating the tag RAM 22. Further, it is every 8 words that a word to be read out moves beyond a cache line of 8 words to the next cache line. Therefore, only by monitoring whether there is any change in bit3 of the access address, namely, the lowest bit inputted to the tag RAM 22, it can be known whether the cache line for storing a word to be read out has moved to the next cache line or not. If it moves to the next cache line, it is not known whether the word of the access address is stored in the cache line or not, and the tag RAM 22 has to be activated to judge whether this is a cache hit or not. Therefore, when there is a change in bit3, the clock signal CLK has to be supplied to the tag RAM 22.

In the case where a branch instruction is detected in the processor 14, the branch instruction detecting signal becomes HIGH. When such a branch instruction is executed, the value of the fetch counter jumps to the target access address. Therefore, it is not known whether a word of the jumped access address is stored in the data RAM 20 or not. Then, when a branch instruction is detected, it is necessary to supply the clock signal CLK to the tag RAM 22 and thereby activate the tag RAM 22 to judge whether it is a cache hit or not.

Except for the cases where bit3 in the access address from the processor 14 and/or the branch instruction detecting signal from the processor is HIGH, it is apparent that a word as an instruction to be read is stored in the data RAM 20. Therefore, without the need for activating the tag RAM 22, it is sufficient to output from the latch circuit 42 the hit/miss judging signal indicating the occurrence of a cache hit. And, since this hit/miss judging signal is LOW, data read out from the data RAM 20 is taken into the processor 14.

Moreover, since the branch instruction detecting signal from the processor 14 is one used in typical processors, the instruction cache memory 12 can be realized without changing the design of the processor. That is, a typical processor 14 uses a selection signal which indicates whether the content of the fetch counter in the processor 14 should be an incremental value of the last fetch counter or a branch address. Therefore, this selection signal can be used as the branch instruction detecting signal according to this embodiment.

The invention is not limited to the embodiment explained above but can be modified in various modes. For example, although one word is assumed to be 32 bits in the above embodiment, one word may be 16 bits, for example. Further, the number of bits of an access address, memory size of the data RAM 20 and number of words in each cache line are not limited to those explained with the embodiment.

Furthermore, although the above embodiment has been explained about the instruction cache memory of a direct mapping type, the invention is similarly applicable also to an instruction cache memory of a set associative mapping type or a full associative mapping type.

Figure 6:
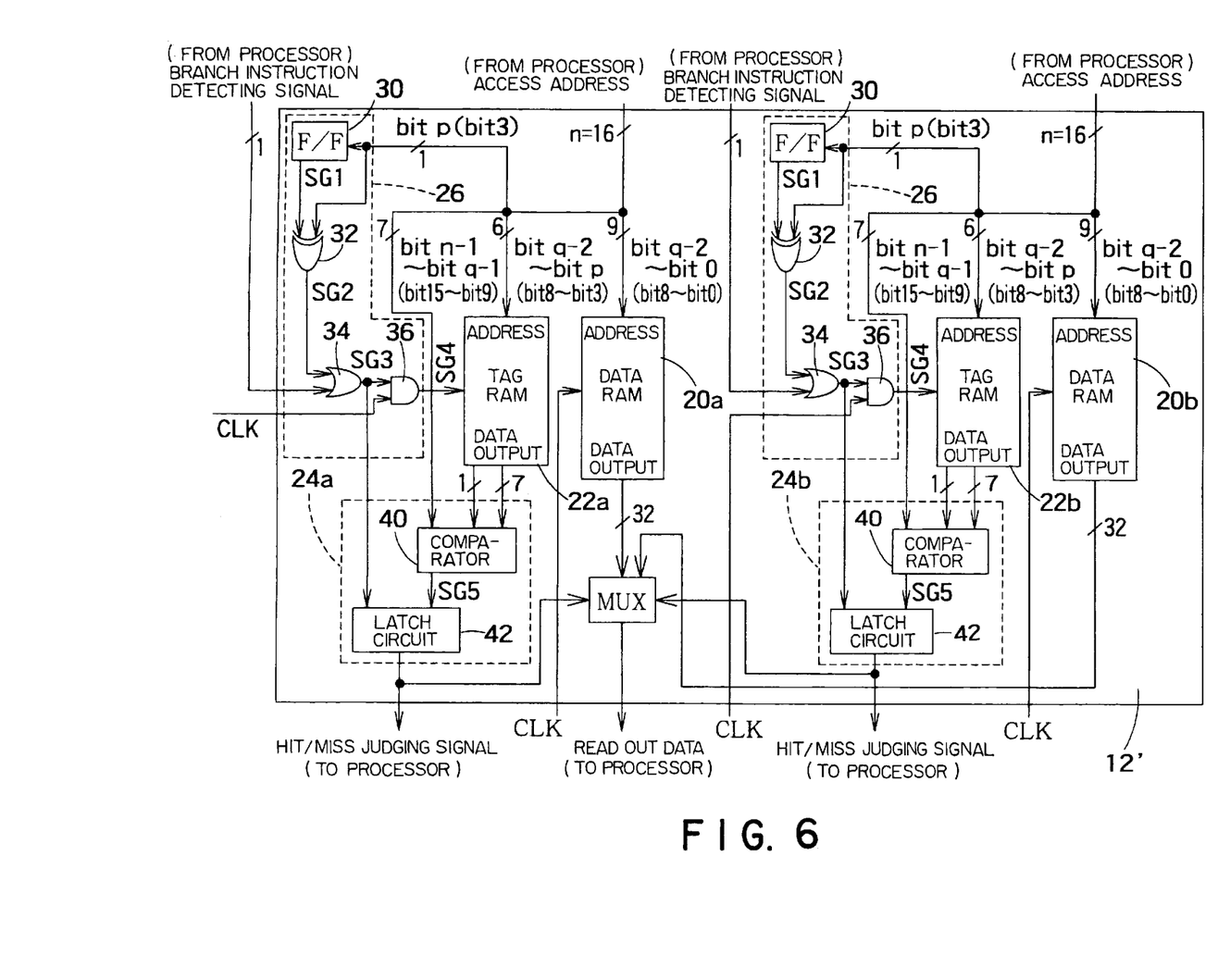
FIG. 6 is a diagram showing an example of application of the invention to an instruction cache memory of a set associative mapping type.

FIG. 6 is a diagram showing a structure of an instruction cache memory of a 2-way set associative mapping type using the invention. As shown in FIG. 6, the instruction cache memory 12' has, in its general aspect, a structure combining two sets of instruction cache memories 12 of a direct mapping type. The memory size of the data RAM 20a is 512 words, and the memory size of the data RAM 20b is 512 words as well. Therefore, the sum of the data RAMs 20a and 20b makes the memory size of 1 K words equal to that of the foregoing embodiment. The data RAMs 20*a*, 20*b* each include 64 cache lines, in total, and each cache line includes 8 words. Tag RAMs 22*a*, 22*b* each include tags for 64 cache lines. The instruction cache memory 12' includes a multiplexer 50 which is a circuit configured to select one of two data RAMs 20*a*, 20*b* to supply data read-out data therefrom to the processor. The multiplexer 50 is supplied with data read out from the data RAMs 20*a*, 20*b* and hit/miss judging signals from hit/miss judging circuits 24*a*, 24*b*. Then, the multiplexer 50 determines in which of the data RAMs 20*a* and 20*b* the word to be read out is stored by reference to the hit/miss judging signal as output signals from the hit/miss judging circuits 24*a*, 24*b*.

As described above, the instruction cache memory according to the invention includes a clock gate circuit to supply a clock signal to the tag RAM only when the cache line for storing a word to be read out changes from one to another, and/or, a branch instruction is detected in the processor, and otherwise stop the supply of the clock signal to the tag RAM. Therefore, activation of the tag RAM is reduced, and power consumption can be reduced.

What is claimed is:

1. An instruction cache memory comprising:

data RAM including a plurality of cache lines for storing a plurality of words which have consecutive memory addresses to output read-out data in response to an access address inputted from a processor;

tag RAM for storing data necessary for specifying said memory addresses of the words stored in said cache lines as tag addresses for each cache line of said data RAM, and outputting one of said tag addresses of corresponding one of said cache lines as a tag signal in response to said access address inputted from said processor;

a hit/miss judging circuit for comparing said tag signal outputted from said tag RAM with said access address from said processor to judge whether a word having said memory address corresponding to said access address is stored in said data RAM or not and output a result of the judgement as a hit/miss judging signal; and a clock gate circuit for selectively supplying a clock signal to said tag RAM when the cache line for storing the word to be read out changes from one to another, or, a branch instruction is detected in said processor, and otherwise stop the supply of the clock signal to said tag RAM.

2. The instruction cache memory according to claim 1 wherein whether said cache line for storing the word to be read out has changed from one to another is detected by monitoring a shifting bit which is a bit in the access address which changes upon movement from a bottom access address of one of said cache line to a top access address of a next cache line while the word is read out sequentially from said cache line.

3. The instruction cache memory according to claim 2 wherein whether the branch instruction has been detected or not in the processor is judged from a branch instruction detecting signal outputted from the processor.

4. The instruction cache memory according to claim 3 wherein said hit/miss judging circuit outputs a hit/miss judging signal indicating a cache hit while the supply of the clock signal to said tag RAM is stopped.

5. The instruction cache memory according to claim 4 wherein said clock gate includes:

a flip-flop circuit supplied with said shifting bit;

an EXOR circuit supplied with an output signal from said flip-flop and said shifting bit;

an OR circuit supplied with an output signal from said EXOR circuit and said branch instruction detecting signal; and an AND circuit supplied with an output signal from said OR circuit and a basic clock signal which changes between HIGH and LOW levels in each clock cycle repeatedly in all clock cycles, and outputting an output signal as said clock signal to said tag RAM.

6. An instruction cache memory which is supplied with an access address of n bits from bit n-1 to bit 0 and a basic clock signal which changes between HIGH and LOW levels in each clock cycle repeatedly in all clock cycles and outputs a hit/miss judging signal of one bit and a read-out data of m bits, comprising:

data RAM including a plurality of cache lines for storing a plurality of words which have a number of consecutive memory addresses which can be expressed by p bits and having a memory size which can be expressed by q bits, said data RAM being supplied with low order bits which are bit q-1 through bit 0 among n bits of said access address, and outputting said read-out data of m bits;

tag RAM for storing high order bits which are bit n-1 through bit q among n bits of the memory address of a plurality of words stored in each cache line as a tag address for each cache line, said tag RAM being supplied with bit q-1 to bit p among n bits of said access address and outputting said tag address stored in association with a cache line specified by bit q-1 through bit p as a tag signal;

a hit/miss judging circuit supplied with said tag signal outputted from said tag RAM and high order bits which are bit n-1 through bit q among n bits of said access address to compare said tag signal with said bit n-1 through bit q and output a hit/miss judging signal of one bit which indicates whether a word having said memory address corresponding to said access address is stored in said data RAM or not; and a clock gate circuit for selectively supplying a clock signal as a supplied clock signal to said tag RAM when the cache line for storing the word to be read out changes from one to another, or, a branch instruction is detected in said processor, and otherwise stopping the supply of said supplied clock signal to said tag RAM.

7. The instruction cache memory according to claim 6 wherein whether said cache line for storing a word to be read out has changed from one to another is detected by whether bit p in n bits of said access address has changed or not.

8. The instruction cache memory according to claim 7 wherein whether the branch instruction has been detected or not in the processor is judged from a branch instruction detecting signal of one bit outputted from the processor.

9. The instruction cache memory according to claim 8 wherein said hit/miss judging circuit outputs a hit/miss judging signal indicating a cache hit while the supply of the clock signal to said tag RAM is stopped.

10. The instruction cache memory according to claim 9 wherein said clock gate includes:

a flip-flop circuit supplied with bit p among n bits of said access address;

an EXOR circuit supplied with an output signal from said flip-flop and said bit p among n bits of said access address;

an OR circuit supplied with an output signal from said EXOR circuit and said branch instruction detecting signal; and an AND circuit supplied with an output signal from said OR circuit and said basic clock signal, and outputting an output signal as said clock signal to said tag RAM.

11. The instruction cache memory according to claim 10 wherein said hit/miss judging circuit includes:

a comparator supplied with said tag signal from said tag RAM and high order bits which are bit n-i through bit q among n bits of said access address to compare said tag signal with said high order bits, bit n-f through bit q, among n bits of said access address and output a comparison result signal; and a latch circuit supplied with said comparison result signal from said comparator and said output signal from said OR circuit in said clock gate circuit to hold a status of said comparison result signal when the output signal from said OR circuit becomes HIGH and to output it as said hit/miss judging signal.

12. An instruction cache memory of an x-way set associative mapping type which is supplied with an access address of n bits from bit n-1 through bit 0 and a basic clock signal which changes between HIGH and LOW levels in each clock cycle repeatedly in all clock cycles and outputs x hit/miss judging signals of one bit and one read-out data of m bits, said cache memory including x basic units each outputting one of said hit/miss judging signal of one bit and one unit read-out data of m bits, each said basic unit comprising:

data RAM including a plurality of cache lines for storing a plurality of words having a number of consecutive memory addresses which can be expressed by p bits and having a memory size which can be expressed by q-x-1 bits, said data RAM being supplied low order bits which are bit q-x through bit 0 among n bits of said access address, and outputting said unit read-out data of m bits;

tag RAM for storing high order bits which are bit n-1 through bit q-x-1 among n bits of the memory address of a plurality of words stored in each cache line as a tag address for each cache line, said tag RAM being supplied with bit q-x through bit p among n bits of said access address and outputting said tag address stored in association with a cache line specified by bit q-x through bit p as a tag signal;

a hit/miss judging circuit supplied with said tag signal outputted from said tag RAM and high order bits which are bit n-1 through bit q-x-1 among n bits of said access address to compare said tag signal with bit n-1 through bit q-x-1 and output a hit/miss judging signal of one bit which indicates whether a word having said memory address corresponding to said access address is stored in said data RAM or not; and a clock gate circuit for selectively supplying a clock signal as a supplied clock signal to said tag RAM when the cache line for storing the word to be read out changes from one to another, or, a branch instruction is detected in said processor, and otherwise stopping the supply of said supplied clock signal to said tag RAM, wherein said instruction cache memory further comprises:

a multiplexer supplied with each said unit read-out data outputted from each said basic unit and each said hit/miss judging signal, said multiplexer outputting said unit read-out data outputted from one of said basic units which outputs said hit/miss judging signal indicating that the word having the memory address corresponding to said access address is store in said data RAM thereof as said read-out data to said processor.

13. The instruction cache memory according to claim 12 wherein whether said cache line for storing a word to be read out has changed from one to another is detected by whether bit p in n bits of said access address has changed or not.

14. The instruction cache memory according to claim 13 wherein whether the branch instruction has been detected or not in the processor is judged from a branch instruction detecting signal of one bit outputted from the processor.

15. The instruction cache memory according to claim 14 wherein said hit/miss judging circuit outputs a hit/miss judging signal indicating a cache hit while the supply of the clock signal to said tag RAM is stopped.

16. The instruction cache memory according to claim 15 wherein said clock gate includes:

a flip-flop circuit supplied with bit p among n bits of said access address;

an EXOR circuit supplied with an output signal from said flip-flop and said bit p among n bits of said access address;

an OR circuit supplied with an output signal from said EXOR circuit and said branch instruction detecting signal; and an AND circuit supplied with an output signal from said OR circuit and said basic clock signal, and outputting an output signal as said clock signal to said tag RAM.

17. The instruction cache memory according to claim 16 wherein said hit/miss judging circuit includes:

a comparator supplied with said tag signal from said tag RAM and high order bits which are bit n-1 through bit q-x-1 among n bits of said access address to compare said tag signal with said high order bits, bit n-1 through bit q-x-1, among n bits of said access address and output a comparison result signal; and a latch circuit supplied with said comparison result signal from said comparator and said output signal from said OR circuit in said clock gate circuit to hold said comparison result signal of a status taken when the output signal from said OR circuit becomes HIGH and output it as said hit/miss judging signal.

* * * * *